3,439,857
POROUS SOLDERING IRON TIP
Donald C. Bennett, 7 Sullivan Way,
East Brunswick, N.J. 08816
Filed Oct. 22, 1965, Ser. No. 502,062
Int. Cl. B23k 3/02
U.S. Cl. 228—54                3 Claims

ABSTRACT OF THE DISCLOSURE

A continuous system, porous soldering tip capable of holding large quantities of solder and releasing the same on contact with a surface to be soldered.

---

My invention relates to soldering generally and specifically to a porous soldering tip which absorbs liquid solder within the interstices of its body, which interstices function as a reservoir and which releases absorbed solder at a controlled rate to a suitable surface which the solder wets.

In presently known soldering tips, a relatively small, limited quantity of solder is deposited on the surface thereof and released when the molten solder is contacted with a wettable surface. Unfortunately, since such soldering tips hold very little solder, it must frequently be retinned. Since the operator usually holds the soldering iron in one hand and the work piece in the other, it is difficult if not impossible to retin the iron without putting down the work piece which then cools and frequently is damaged.

In addition, presently known soldering irons release collected solder in an uncontrolled manner, large quantities frequently rolling off the iron if too much solder has been applied thereto. Even with a properly tinner soldering iron, the solder is released in an uneven manner. Moreover, in heavily tinner soldering irons, the solder tends to drip.

Therefore, it is among the objects and advantages of my invention to provide a soldering iron tip having a porous body which absorbs relatively large quantities of solder within its interstices.

Another object of my invention is to provide a soldering tip fabricated of sintered and pressed or unpressed metal powder which defines a porous body.

A further object of my invention is to provide a soldering tip in which the porous body is invested with a large number of interconnecting interstices.

Yet another object of my invention is to provide a soldering tip in which the interconnecting interstices of the body thereof intersect the surface.

Yet a further object of my invention is to provide a soldering tip in which the effective diameter of the interstices of the body control the mass rate of discharge of solder outwardly therefrom and onto the work surface.

Still another object of my invention is to provide a soldering tip in which the effective diameter of the interstices may be varied by the size of the metal powder particles and the conditions of molding and sintering.

Still yet another object of my invention is to provide a soldering tip having a porous body and a plurality of passages within the body intersecting its surface intermediate its ends, which passages are relatively larger than the interconnecting interstices of the porous body itself.

These objects and advantages as well as other objects and advantages may be achieved by my invention, two embodiments of which are illustrated in the drawings, in which.

Figure 1:
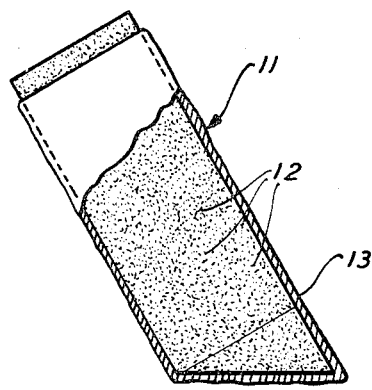
FIGURE 1 is a side elevational cross-sectional view of a soldering tip fabricated of sintered metal powder defining a porous body having a large number of interconnecting interstices which intersect the surface of the tip.

Referring now to the drawings in detail, my soldering tip 11, illustrated in FIGURE 1, may be fabricated of any one or an alloy of a large number of metal powders. In a preferred embodiment of my invention, copper powder is screened to —60 +100 mesh and is thereafter charged into a mold cavity. The copper is then sintered by a process like that for preparing metal filters which is well known. Of course, the metal powder may be compressed in the mold cavity and the conditions of sintering may be varied to change the effective diameter of the interstices in the porous body.

The limiting characteristic of the tip and the solder applied thereto is that the solder must melt at a temperature lower than the melting point of the metal of the tip and, the metal of the tip must not be excessively soluble in the solder at the melting point of the solder or the temperature usually encountered on the tip. In Table I, I have listed a large number of metals from which tips may be fabricated and the soldered metals which are compatible therewith.

When solder is brought into contact with the porous body of my tip, the capillary action of the pores or interstices 12 produces absorption of the solder therein. Thus, the interstices 12 throughout the tip 11 becomes a reservoir for the solder. The transfer of solder from its source of supply to the tip continues until the interstices 12 have been substantially filled.

When the tip 11 is brought into contact with a work piece to be soldered, the solder film 13 normally lying on the surface of the tip 11 wets the work piece thereby drawing solder from the interstices 12. The transfer of solder from the interstices 12 of the tip 11 continues until the surface tension of the solder tending to hold the solder within the interstices 12 is balanced by the surface tension forces encountered at the work piece tending to draw the solder thereonto. The effective diameter of the interconnecting pores of the tip 11 is relatively small and therefore, only a thin, constantly controlled stream of solder can be transferred to the work piece. Nevertheless, an overall, totally large amounts of solder may be transferred from the tip 11 to the work piece before recharging or retinning of the porous reservoir body 11 is needed. Without the surface tension forces encountered at the work piece surface, the solder cannot flow from the tip 11 due to the surface tension forces encountered in the porous interstices 12. Thus, my tip can never accidentally drip.

Figure 2:
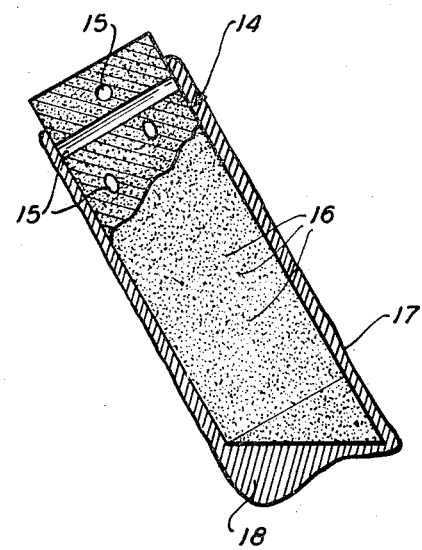
FIGURE 2 is a side elevational cross-sectional view of an alternative form of porous soldering tip having relatively larger passages in the porous body intermediate its ends and intersecting its surface.

Under certain conditions, it is desirable to increase the specific quantity of solder transferred to the workpiece at any one point. Such conditions call, of course, for a relatively large mass rate of solder transfer. The alternative form of my invention illustrated in FIGURE 2 is employed for such applications. The soldering iron tip 14 is provided with a region of relatively larger pores or passages 15. The effective diameter of the pores 15 is considerably larger than the effective diameter of the pores 16 of the tip body 14 produced by the sintering process. The surface tension forces produced by the relatively large pores 15 is substantially less than the surface tension produced by the relatively small pores 16. Thus, solder will flow more readily from the region of larger pores 15 than it does from the region of smaller pores 16. If the pores 15 are sufficiently large, a relatively thick film 17 or a small droplet 18 forms on the underside of the tip 14 as a result of the difference in hydrostatic pressure between the region having the large pores 15 and the region therebelow having relatively small pores 16. Such a tip is able to discharge larger quantities of solder to any one point of the workpiece.

One practical way to produce a region of relatively larger pores 15 is to drill holes through the tip or the cut slots or grooves therein of the desired diameter. Of course, the larger pores 15 hold greater quantities of solder and therefore, although greater quantities of solder are transferred to the workpiece, the reservoir will require appoximately the same time to be drained for any given size of tip body.

The foregoing description is merely intended to illustrate an embodiment of the invention. The component parts have been shown and described. They each may have substitutes which may perform a substantially similar function; such substitutes may be known as proper substitutes for the said components and may have actually been known or invented before the present invention; these substitutes are contemplated as being within the scope of the appended claims, although they are not specifically catalogued herein.

TABLE I

| Metal of Tip | Metal of Solder |
|---|---|
| Germanium | Indium, lead, and tin. |
| Iridium | Magnesium, silver, gold, bismuth, and tin. |
| Molybdenum | Aluminum, copper, magnesium, lead, tin and zinc. |
| Nickel | Silver, lead, indium. |
| Platinum | Magnesium. |
| Silver | Cadmium and indium. |
| Tantalum | Silver, gold and copper. |
| Titanium | Cadmium. |
| Vanadium | Silver, gold and aluminum. |
| Silver | Bismuth, cadmium, gallium, indium, lead and tin. |
| Cobalt | Aluminum, indium, lead, tin and zinc. |
| Chromium | Aluminum, lead, antimony and tin. |
| Copper | Bismuth, cadmium, gallium, indium, lead and tin. |
| Iron | Silver, barium, bismuth, cadmium, magnesium, lead, antimony, tin and zinc. |
| Tungsten | Silver, aluminum, gold, bismuth, copper, magnesium, manganese and tin. |

I claim:
1. A porous soldering iron comprising,
   (a) a continuous, porous, metallic body of sintered metallic particles, defining a generally pointed tip and an integral, relatively elongated shank,
   (b) the shank having a plurality of interstices relatively larger than the interstices of the tip communicating the surface of the shank.
2. A porous soldering iron comprising,
   (a) the structure in accordance with claim 1, and
   (b) a region in the porous body displaced from one end thereof having a plurality of interstices relatively larger than the interstices of the porous body communicating with the surface of the shank.
3. A porous soldering iron comprising,
   (a) the structure in accordance with claim 1 in which the porous body is fabricated of a metal selected from the group consisting of germanium, iridium, molybdenum, nickel, platinum, silver, tantalum, titanium, vanadium, silver, cobalt, chromium, copper, iron and tungsten, and
   (b) the body is tinned with a metal solder selected from the group consisting of indium, lead, tin, magnesium, silver, gold, bismuth, aluminum, copper, zinc, carmium, gallium, antimony, barium, and manganese.

References Cited

UNITED STATES PATENTS

| 399,387 | 3/1889 | Dolan | 228—54 |
| 1,760,519 | 5/1930 | Palmer | 228—35 |
| 3,157,143 | 11/1964 | Van Emden | 228—54 |

RICHARD H. EANES, Jr., *Primary Examiner.*